March 8, 1949.  O. W. JOHNSON  2,463,879
TRIGGER FOR MOUSETRAPS
Filed March 11, 1946
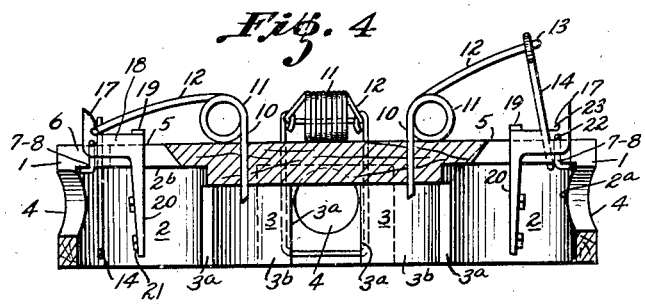
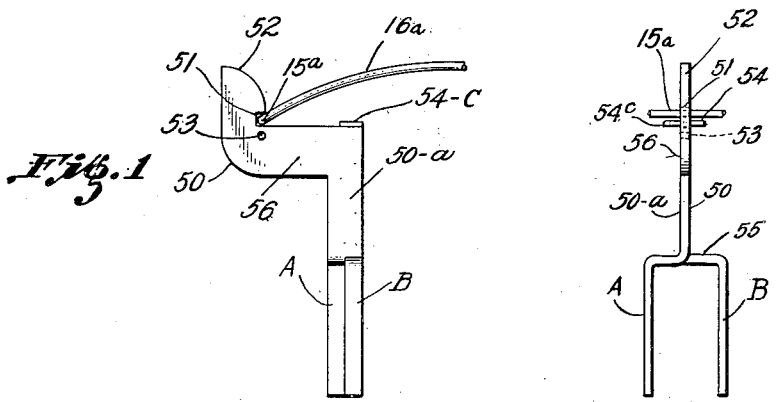 
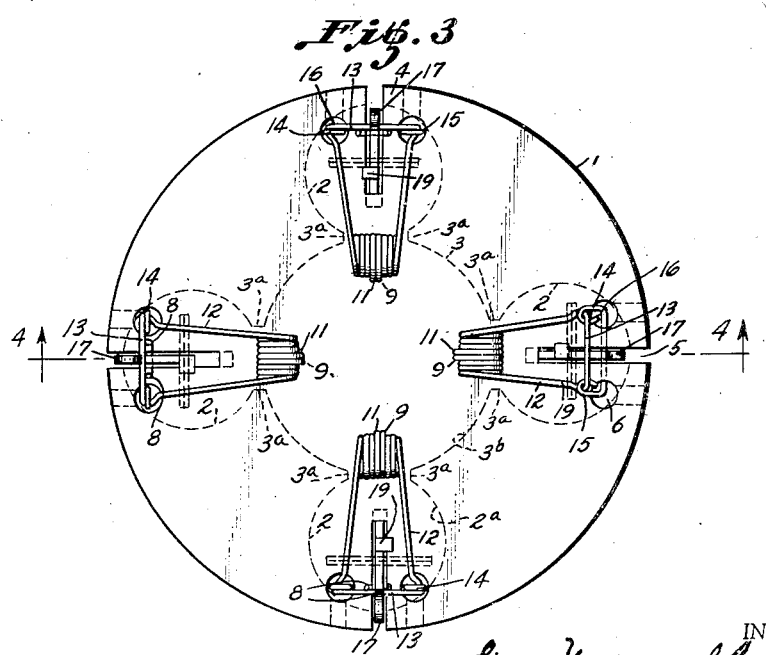
INVENTOR.
Oliver Warren Johnson
BY

Patented Mar. 8, 1949

2,463,879

UNITED STATES PATENT OFFICE 2,463,879

TRIGGER FOR MOUSETRAPS

Oliver Warren Johnson, Geneva, Ohio

Application March 11, 1946, Serial No. 653,668

3 Claims. (Cl. 43—86)

This application relates to improvements in the triggers used in the choker type of mouse trap such as disclosed in my copending application Serial No. 595,134 which has become abandoned and of which the instant application is a continuation-in-part thereof.

One of the objects of this invention is to provide a trigger to permit a clear and unobstructed view of the bait from the entrance apertures in said trap.

Another object is to provide means whereby the mouse is directed to travel in a comparatively straight line from entrance to bait and thus prevent it from dodging the trigger elements.

Another object is to employ the principle of springing the trap by a pushing movement of the mouse against the trigger thereof.

Another object is to provide means for holding said trigger in free operative alignment with a slot in its supporting body.

Other objects and advantages more or less pertinent, and the manner in which the various objects are achieved will appear in the following description and drawings hereto attached showing the preferred construction of the invention.

Fig. 1 shows a side elevation of the trigger.

Fig. 2 is an end or front view of the trigger.

Fig. 3 is a plan view of a choker type mouse trap.

Fig. 4 is a sectional view taken along the line 4—4 in Fig. 3.

The trap comprises a member 1 having walls to provide execution chambers 2 and a bait chamber 3. The wall 2—a of chamber 2 has an opening 4 leading to the said execution chamber 2, and communicates through a passage 3—a with a central chamber 3 in which the bait may be placed. The chamber 2 has a ceiling 2—b provided with a slot 5, and holes 6 on opposite sides of the slot. 3—b designates the wall of the bait chamber.

Rigidly secured in the ceiling 2—b are arms 10 of helical spring 11 having extending arms 12 provided with transverse portions 13. The portions 13 have at their ends loops 16 to engage loops 15 on arms 14 of a V-shaped garrote member. The arms 14 depending through holes 6 into the execution chambers 2 are spaced to provide a passage in alignment with the openings 4.

A trigger 20 having a vertical arm in chamber 2 in alignment with the passage of the garrote member and the opening 4, has a horizontal arm 18 mounted on a pivot formed by a staple 7 which is secured in openings 8 of the ceiling 2—b. Trigger 20 has at its upper end a latch head 17 adapted to be engaged by the transverse portion 13 of the helical spring 11. The trigger 20 has a lug 19 on one end of the horizontal arm 18 to engage the top surface of the member 1 to limit swinging movement of the trigger 20 to a short arc so as to retain the trigger latch head 17 in position so that a notch 23 therein can be engaged by the transverse portion 13 of the spring 11. The trigger 20 has crossbars 21 to engage the animal's head or body when it endeavors to reach the bait in the bait chamber 3, which can be seen through the passage 3—a. The bait is placed in the chamber 3 so as to be in line with all of the openings 4 and the passages 3—a. The arms 12 of the springs 11 are manually depressed until the transverse portions 13 engage latch member 17, and are received in the notches 23 and held in set position by the trigger 20. In this position the garrote member is suspended so that the passage between arms 14 thereof is in alignment with the openings 4 of the passage 3—a and the bait. The trap in this condition is set and ready for service.

The invention consists of a trigger 50 to be used in lieu of the trigger 20 described above. It comprises a member having an arm 50—a bifurcated at its lower end so as to provide spaced prongs A and B. A transverse part 56 connects the arm 50—a with a second arm extending upwardly from the part 56 having a curved rounded edge 52 and a notch 51 to receive a transverse portion 15—a of a spring 16—a corresponding to the spring 11 of the trap previously described. The trigger 50 has an opening 53 to receive the staple 7. A transverse member 54 having portions 54—c on opposite sides thereof to constitute stops, corresponds to the stop member 19 of the previously described trap. The purpose of having two stops is to provide better balance for the trigger.

The spacing of the prongs A and B is sufficient to give an unobstructed view of the bait and yet be so small as to prevent a mouse from passing between the prongs without springing the trap.

What I claim as new and desire covered by Letters Patent is:

1. In a mousetrap of the class described, an irregular bell crank shaped trigger element consisting of a head, a notch in said head, a short right angled extension arm integral with said head, said extension having a pivoting hole under said notch, a depending arm integral with the free end of said extension, intercepting elements integral with the lower section of said depending arm, and stop lugs integral with the top section of the free end of said right angled extension arm.

2. In a mousetrap of the class described, an irregular bell crank shaped trigger element consisting of a head, a notch in said head, a short right angled extension arm integral with said head, said extension having a pivoting hole under said notch, a depending arm integral with the free end of said extension, and contact prongs in spaced relation with each other depending from and integral with the lower section of said depending arm.

3. In a mousetrap of the class described, an irregular bell crank shaped trigger element consisting of a head, a notch in said head, a short right angled extension arm integral with said head, said extension having a pivoting hole under said notch, stop lugs on said extension, a depending arm underneath said lugs and integral with said extension, and contact prongs in spaced relation to each other depending from an integral with the lower section of said depending arm.

OLIVER WARREN JOHNSON.

REFERENCES CITED

The following references are of record in the file of this patent:

UNITED STATES PATENTS

| Number | Name | Date |
|---|---|---|
| 314,133 | Jarvis | Mar. 17, 1885 |
| 450,545 | Warner | Apr. 14, 1891 |
| 872,041 | Armstrong et al. | Nov. 26, 1907 |
| 882,755 | Hamilton | Mar. 24, 1908 |